United States Patent [19]

Caroli

[11] Patent Number: 5,610,762

[45] Date of Patent: Mar. 11, 1997

[54] APPARATUS AND METHOD OF MAKING REFLEX MOLDS

[75] Inventor: Italo Caroli, Westmount, Canada

[73] Assignee: DBM Reflex Enterprises Inc., Montreal, Canada

[21] Appl. No.: 418,203

[22] Filed: Apr. 7, 1995

[30] Foreign Application Priority Data

Apr. 11, 1994 [CA] Canada ................................. 2120996

[51] Int. Cl.$^6$ ........................... G02B 5/126; B29D 11/00; F21V 5/00
[52] U.S. Cl. .................... 359/535; 359/900; 29/527.2; 65/357; 65/359; 72/47; 72/379.2; 264/2.5; 427/163.4; 362/326
[58] Field of Search ..................... 359/530, 542, 359/546, 548, 900, 534, 528, 533; 264/1.1, 1.7, 1.9, 2.5, 2.7; 29/527.2, 527.3, 527.4, 527.5; 72/56, 47, 54, 379.2; 427/166, 163.4; 362/337, 339, 348, 326; 65/357, 359

[56] References Cited

U.S. PATENT DOCUMENTS

| 1,591,572 | 7/1926 | Stimson | 264/1.9 |
| 1,906,655 | 5/1933 | Stimson | 264/1.9 |
| 2,555,191 | 5/1951 | Haggart, Jr, | 359/542 |
| 3,258,840 | 7/1966 | Hedgewick et al. | 264/2.5 |
| 3,607,992 | 9/1971 | Scheiding | 264/2.5 |
| 3,632,695 | 1/1972 | Howell | 264/2.5 |
| 4,368,951 | 1/1983 | Blom | 264/2.5 |
| 4,406,045 | 9/1983 | Schwab | 359/542 |
| 5,071,597 | 12/1991 | D'Amato et al. | 264/2.5 |

*Primary Examiner*—Ricky D. Shafer
*Attorney, Agent, or Firm*—David L. Davis

[57] ABSTRACT

Method and apparatus is disclosed for manufacturing a reflex mold wherein a flexible or bendable, thin plate is provided for use in the manufacturing process. A reflex prism assembly is clamped together and metal is applied over the surface of the prisms to make a flat, thin layer of bendable material. A model of curvature is then provided and the thin layer is clamped on the model to assume the desired configuration. More metal is then applied over the back surface of the thin layer until sufficient thickness is obtained to make the reflex mold suitable to receive deposition of lens material for the production of a reflex lens.

5 Claims, 2 Drawing Sheets

APPARATUS AND METHOD OF MAKING REFLEX MOLDS

FIELD OF THE INVENTION

This invention relates to the manufacture of molds for use in the production of lamp or light assemblies and, in particular, is directed to a lower cost method of making a mold for a reflex reflector.

BACKGROUND OF THE INVENTION

In many automotive lamp units such as taillight assemblies, the reflex reflector section of the assembly may exceed the effective reflective area that is required by regulation. This excess reflective area is usually due to the overall surface area of the lens being designed to comply with styled contoured surfaces of the vehicle, or the like. In such an arrangement, the reflex reflector portion may combine a so-called effective area, which actually provides the regulatory standard of reflectivity, as well as a simulated area which, while giving the appearance of an effective section, is in fact a section of a lower standard of reflectivity.

Due to the body contours of vehicles, particularly in the automobile designs of recent times where low drag coefficients have dictated the use of more smoothly rounded or contoured surfaces, a reflex reflector section may well be located in a complex curve of a taillight assembly. Further, if a simulated reflex reflector area extends into the curved portion of the assembly, then the manner in which the simulated area is applied in the manufacture of the mold of the lens becomes a deciding factor in manufacturing costs versus quality of appearance.

There are several well known methods of providing a simulated reflective area of quality appearance. One such method is the use of spark erosion in the manufacture of the mold. Another is the use of direct machining of the mold surfaces to provide a diamond surface. Yet another method is the setting up of a mold using a plurality of reflex prisms with multiple axes, a process in which there is a substantial shoulder area between adjacent prisms in the curved section thereof. This latter method, together with the spark erosion and direct machining methods of surfaces are all expensive.

SUMMARY OF THE INVENTION

The purpose of the present invention is to provide a method and means for manufacturing a reflex reflector section of a lamp or taillight assembly which includes both effective and simulated reflective areas and which can be addressed to any curvature within limits of regulations and which will give a viewer the appearance of quality and continuity of the lens. In some cases, complete effective areas may be provided and if the combined areas extend into a curved portion of the lens surface, then the reflective area of the lens according to the invention will provide a quality appearance, flowing from one section to another. Moreover, a method of manufacture according to the invention is a low cost method compared to the known methods referred to above.

The invention may also be used to manufacture an effective reflective area only as long as it is within certain curvature parameters that would still provide a reflex area that meets the required standards of reflectivity.

According to a broad aspect, the invention relates to a method of making a reflex mold for use in manufacturing light assemblies, the method comprising providing a flat block assembly of reflex prisms and clamping the prisms in the assembly; applying a thin layer of metal over the surface of the prisms to make a flat, thin plate of flexible or bendable material; providing a model of curvature relative to a lens contour; clamping the thin, bendable plate of material onto the model to assume a desired configuration; and applying additional metal over the back surface of the thin layer of material until sufficient thickness is obtained to render the mold suitable to receive deposition of lens material.

The metal layer may be applied in one of several ways, such as vapour deposition, electroforming or the like.

The bendable layer may be 0.5 mm in thickness and is preferably 0.25 mm to 0.4 mm in thickness.

BRIEF DESCRIPTION OF THE DRAWING

The invention is illustrated in the accompanying drawings in which.

DESCRIPTION OF THE PREFERRED EMBODIMENT

Figure 1:
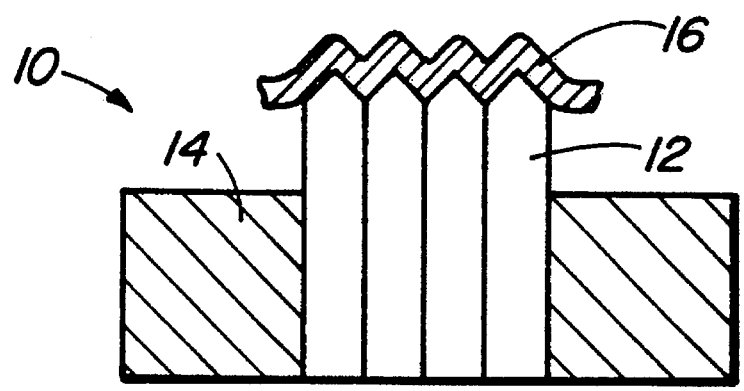
FIG. 1 is a schematic cross-section of a flat assembly of reflex prisms clamped together with a thin layer of metal applied over the prism assembly.
Figure 2:
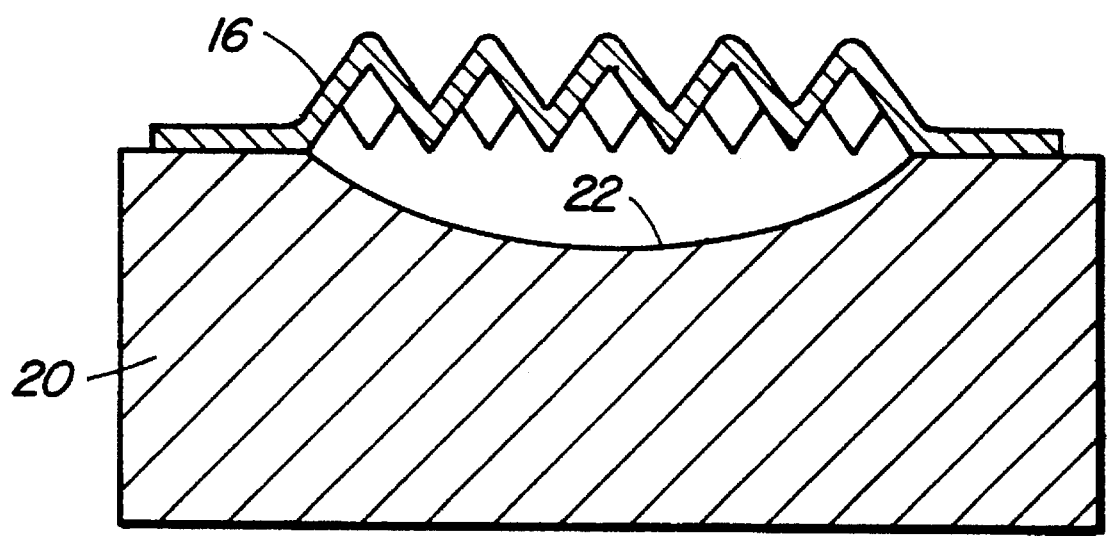
FIG. 2 is a schematic cross-sectional view showing the formed, thin layer of bendable metal mounted on a model.

As shown in FIG. 1, a flat block assembly 10 has a plurality of reflex prisms 12 secured together by clamping means 14. A thin layer of metal 16 is applied over the heads of the prisms to provide, when cooled, a thin plate of 0.25 to 0.4 mm of metal material, as shown in FIG. 2. The layer may extend to 0.5 mm in thickness. The metal material may be applied in one of several ways, such as by electroforming, vapour deposition, or the like. The metal may consist of nickel, copper or any suitable material as required.

Figure 3:
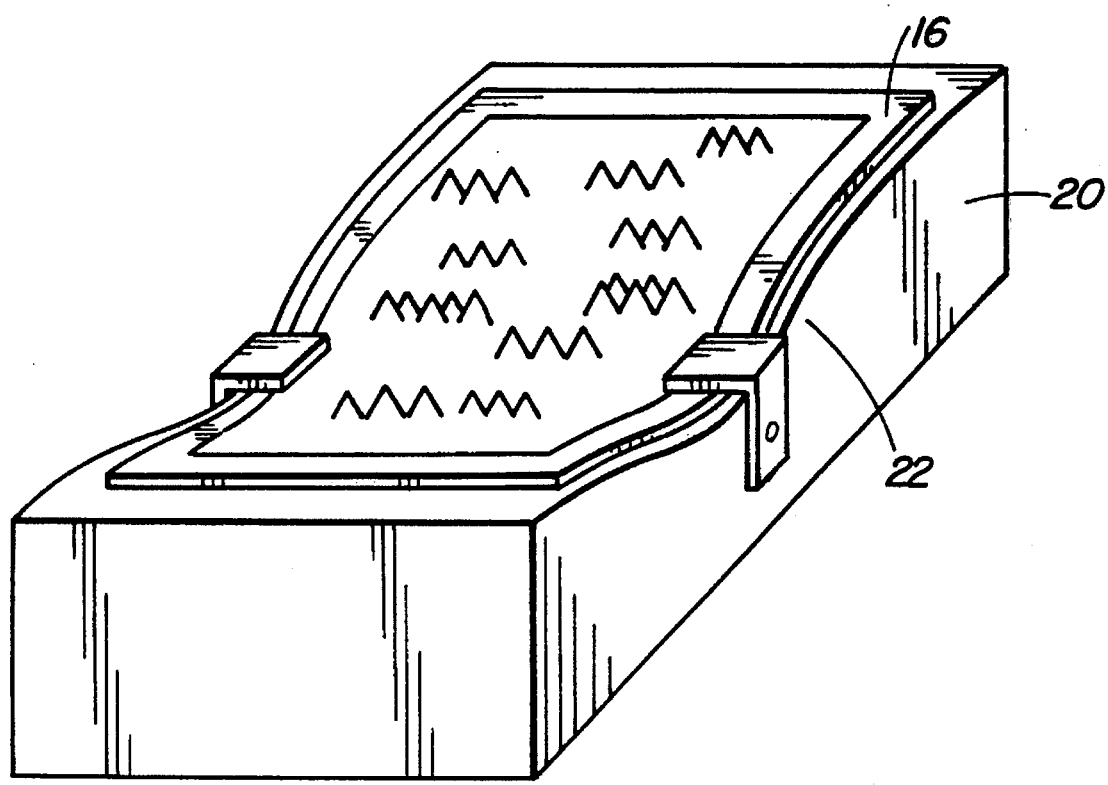
FIG. 3 is a perspective view of the model of curvature with the bendable plate clamped thereon.

As shown in FIG. 3, the resulting bendable, thin metal plate 16 is then placed onto a model 20 having a desired curvature 22 and clamped onto it to assume this curvature with the result being that the axis of the reflex cubes are perpendicular to the surface or contour of the model to which the bendable plate 16 is pressed against.

Figure 4:
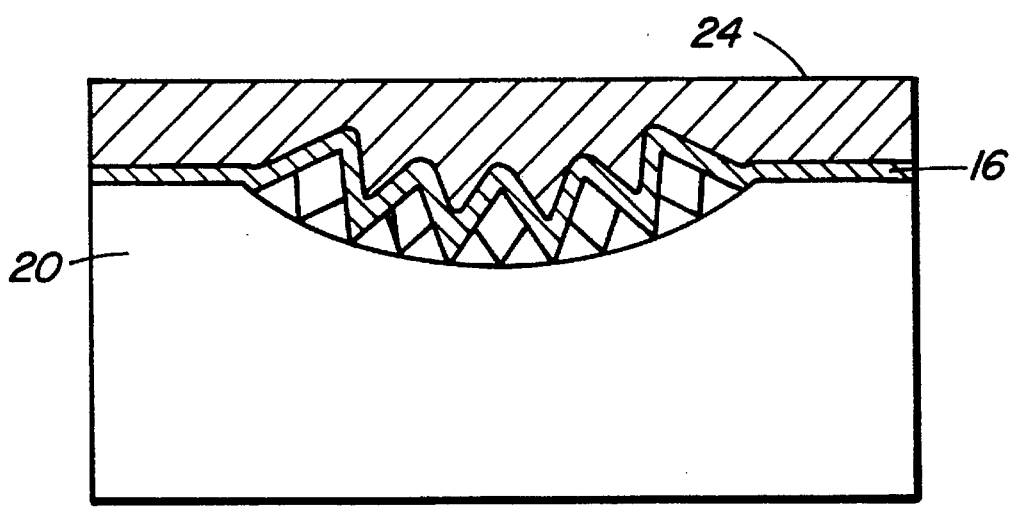
FIG. 4 shows the thin plate to which additional metal has been applied to reach the desired thickness.

FIG. 4 illustrates that, after clamping the thin, bendable plate 16 on the model of curvature 20 so that the bendable layer or plate 16 assumes the desired configuration of the model, a backup layer of metal 24 is built up on the rear surface of the bendable plate 16 until a sufficient thickness of metal is obtained to make the reflex mold suitable to receive deposition of lens material for the production of a reflex lens.

It will be appreciated that the method of manufacturing the thin or bendable plate and subsequently to add more metal to it to reach the desired thickness is both an effective and inexpensive means to obtain the desired configuration of the mold.

While the invention has been described in connection with a specific embodiment thereof and in a specific use, various modifications thereof will occur to those skilled in the art without departing from the spirit and scope of the invention as set forth in the appended claims.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the invention claims.

I claim:

1. A method of making a reflex mold for use in manufacturing a lens for a light assembly, said method comprising:

providing a flat block assembly of reflex prisms and clamping said prisms in the assembly;

applying a thin layer of metal over the surface of said prisms to make a thin plate of bendable material;

providing a model of curvature relative to a contour of said lens;

clamping said thin, bendable metal plate onto the model to assume a desired configuration; and applying additional metal, over the back surface of the thin plate of bendable material with sufficient thickness to render the mold suitable to receive deposition of lens material.

2. A method according to claim 1 wherein the bendable plate is approximately 0.5 mm in thickness.

3. A method according to claim 1 wherein the bendable plate is 0.25 mm to 0.4 mm in thickness.

4. A method according to claim 1 wherein the thin layer of metal is applied over the surface of the prisms by vapour deposition.

5. A method according to claim 1 wherein the thin layer of metal is applied over the surface of the prisms by electroforming.

* * * * *